United States Patent
DiMascio et al.

(10) Patent No.: US 6,284,124 B1
(45) Date of Patent: Sep. 4, 2001

(54) ELECTRODEIONIZATION APPARATUS AND METHOD

(75) Inventors: Felice DiMascio, Rocky Hill, CT (US); Anil Jha; Gary C. Ganzi, both of Lexington, MA (US); Frederick Wilkins, Pepperell, MA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/240,420

(22) Filed: Jan. 29, 1999

(51) Int. Cl.$^7$ .................................................. C02F 1/461

(52) U.S. Cl. .................. 205/753; 205/748; 204/533; 204/536; 204/632; 204/647

(58) Field of Search ..................... 204/524, 533, 204/536, 632, 647; 205/753, 748

(56) References Cited

U.S. PATENT DOCUMENTS

| | | | |
|---|---|---|---|
| 2,514,415 | 7/1950 | Rasch | 136/26 |
| 2,794,777 | 6/1957 | Pearson | 204/151 |
| 2,815,320 | 12/1957 | Kollsman | 204/180 |
| 2,923,674 | 2/1960 | Kressman | 204/180 |
| 3,149,061 | 9/1964 | Parsi | 204/180 |
| 3,291,713 | 12/1966 | Parsi | 204/180 |
| 3,375,208 | 3/1968 | Duddy | 260/2.1 |
| 3,686,089 | 8/1972 | Korngold | 204/180 |
| 3,755,135 | 8/1973 | Johnson | 204/301 |
| 3,869,376 | 3/1975 | Tejeda | 204/301 |
| 3,876,565 | 4/1975 | Takashima et al. | 260/2.1 R |
| 3,989,615 | 11/1976 | Kiga et al. | 204/252 |
| 4,032,452 | 6/1977 | Davis | 210/243 |
| 4,033,850 | 7/1977 | Kedem et al. | 204/301 |
| 4,089,758 | 5/1978 | McAloon | 204/98 |
| 4,130,473 | 12/1978 | Eddleman | 204/252 |
| 4,167,551 | 9/1979 | Tamura et al. | 521/27 |
| 4,216,073 | 8/1980 | Goldstein | 204/296 |
| 4,226,688 | 10/1980 | Kedem et al. | 204/180 P |

(List continued on next page.)

FOREIGN PATENT DOCUMENTS

| | | |
|---|---|---|
| 1044411A | 8/1990 | (CN) . |
| 1201055 | 9/1965 | (DE) . |
| 44 18 812 | 12/1995 | (DE) . |
| 0 503 589 | 9/1992 | (EP) . |
| 0 680 932 | 11/1995 | (EP) . |
| 0 870 533 | 10/1998 | (EP) . |
| 776469 | 6/1957 | (GB) . |
| 1137679 | 12/1968 | (GB) . |
| 1448533 | 9/1976 | (GB) . |
| 47 49424 | 9/1968 | (JP) . |
| 52-71015 | 1/1979 | (JP) . |
| 54-5888 | 1/1979 | (JP) . |
| WO 92/11089 | 7/1992 | (WO) . |
| WO 95/32791 | 12/1995 | (WO) . |
| WO 97/46491 | 12/1997 | (WO) . |
| WO 97/46492 | 12/1997 | (WO) . |
| WO 98/11987 | 3/1998 | (WO) . |
| WO 98/20972 | 5/1998 | (WO) . |

OTHER PUBLICATIONS

Glueckauf, Electro–Deionisation Through a Packed Bed, Dec. 1959, pp. 646–651, British Chemical Engineering.

(List continued on next page.)

Primary Examiner—Kathryn Gorgos
Assistant Examiner—Thomas H. Parsons
(74) Attorney, Agent, or Firm—Wolf, Greenfield & Sacks, P.C.

(57) ABSTRACT

Electrodeionization apparatus and method. The electrodeionization apparatus includes an ion-depleting compartment in which alternating layers of an electroactive media are positioned. One of the alternating layers is doped to provide a more balanced current distribution through the apparatus. The method involves reducing the difference in conductivity between the alternating layers positioned in the ion-depleting compartment by adding a dopant material to one of the layers.

83 Claims, 6 Drawing Sheets

U.S. PATENT DOCUMENTS

| | | | |
|---|---|---|---|
| 4,298,442 | 11/1981 | Giuffrida | 204/180 P |
| 4,430,226 | 2/1984 | Hedge et al. | 210/638 |
| 4,465,573 | 8/1984 | O'Hare | 204/180 P |
| 4,473,450 | 9/1984 | Nayak et al. | 204/147 |
| 4,505,797 | 3/1985 | Hodgdon et al. | 204/252 |
| 4,632,745 | 12/1986 | Giuffrida et al. | 204/301 |
| 4,636,296 | 1/1987 | Kunz | 204/182.5 |
| 4,671,863 | 6/1987 | Tejeda | 204/266 |
| 4,687,561 | 8/1987 | Kunz | 204/182.5 |
| 4,707,240 | 11/1987 | Parsi et al. | 204/290 F |
| 4,747,929 | 5/1988 | Siu et al. | 204/301 |
| 4,747,955 | 5/1988 | Kunin | 210/679 |
| 4,753,681 | 6/1988 | Giuffrida et al. | 134/22.17 |
| 4,804,451 | 2/1989 | Palmer | 204/301 |
| 4,925,541 | 5/1990 | Giuffrida et al. | 204/182.5 |
| 4,931,160 | 6/1990 | Giuffrida | 204/301 |
| 4,956,071 | 9/1990 | Giuffrida et al. | 204/301 |
| 4,983,267 | 1/1991 | Moeglich et al. | 204/182.4 |
| 5,026,465 | 6/1991 | Katz et al. | 204/182.4 |
| 5,066,375 | 11/1991 | Parsi et al. | 204/182.4 |
| 5,084,148 | 1/1992 | Kazcur et al. | 204/95 |
| 5,092,970 | 3/1992 | Kaczur et al. | 204/98 |
| 5,106,465 | 4/1992 | Kaczur et al. | 204/98 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,196,115 | 3/1993 | Andelman | 210/198.2 |
| 5,203,976 | 4/1993 | Parsi et al. | 204/182.4 |
| 5,211,823 | 5/1993 | Giuffrida et al. | 204/182.5 |
| 5,223,103 | 6/1993 | Kazcur et al. | 204/95 |
| 5,240,579 | 8/1993 | Kedem | 204/182.4 |
| 5,254,227 | 10/1993 | Cawlfield et al. | 204/131 |
| 5,292,422 | 3/1994 | Liang et al. | 204/301 |
| 5,308,466 | 5/1994 | Ganzi et al. | 204/151 |
| 5,316,637 | 5/1994 | Ganzi et al. | 204/182.4 |
| 5,346,624 | 9/1994 | Libutti et al. | 210/679 |
| 5,356,849 | 10/1994 | Matviya et al. | 502/180 |
| 5,376,253 | 12/1994 | Rychen et al. | 204/301 |
| 5,434,020 | 7/1995 | Cooper | 429/210 |
| 5,444,031 | 8/1995 | Hayden | 502/180 |
| 5,451,309 | 9/1995 | Bell | 204/301 |
| 5,458,787 | 10/1995 | Rosin et al. | 210/719 |
| 5,460,725 | 10/1995 | Stringfield | 210/690 |
| 5,460,728 | 10/1995 | Klomp et al. | 210/698 |
| 5,489,370 | 2/1996 | Lomasney et al. | 204/627 |
| 5,503,729 | 4/1996 | Batchelder et al. | 204/630 |
| 5,518,626 | 5/1996 | Birbara et al. | 210/670 |
| 5,518,627 | 5/1996 | Tomoi et al. | 210/682 |
| 5,538,611 | 7/1996 | Otowa | 204/550 |
| 5,538,655 | 7/1996 | Fauteux et al. | 252/62.2 |
| 5,593,563 | 1/1997 | Denoncourt et al. | 204/524 |
| 5,679,228 | 10/1997 | Batchelder et al. | 204/524 |
| 5,679,229 | 10/1997 | Goldstein et al. | 204/524 |
| 5,858,191 * | 1/1999 | DiMascio et al. | 204/524 |
| 5,868,915 * | 1/1999 | Ganzi et al. | 204/524 |
| 5,891,328 | 4/1999 | Goldstein | 210/321.6 |

OTHER PUBLICATIONS

Matějka, Continuous Production of High–Purity Water by Electro–Deionisation, 4/71, pp. 117–120, J. Appl. CHem., Biotechnol. vol. 21.

International Search Report PCT/US97/17190, dated Jan. 15, 1998.

International Search Report PCT/US97/17189, dated Jan. 15, 1998.

G.J. Gittens et al., Some Experimental Studies of Electro-deionization Through Resin Packed Beds, 3/64, Harwell, Chemistry Div., U.K.A.E.A. Research Group, Atomic Energy Research Establishment pp. 1–33 (odd pages only).

Dow Chemical Bulletin, DOWEX 11 Type Anion Resin. No month and/or date provided.

Dow Chemical Bulletin, DOWEX MARATHON C Cation Resin. No month and/or date provided.

Desalination, 16, Korngold, Electrodialysis Process Using Ion Exchange Resins Between Membranes, 1975, pp. 225–233. No month and/or date provided.

Sammon et al., An Experimental Study of Electrodeionisation and Its Application to the Treatment of Radioactive Wastes, 6/60, Chemistry Division, U.K.A.E.A. Research Group, Atomic Energy Research Establishment, Harwell.

DiMascio et al., Electrodiaresis Polishing, pp. 164–172. No month and/or date provided.

Farmer et al., Capacitive deionization of $NH_4ClO_4$ solutions with Carbon Aerogel Electrodes, J. Appl. Electro–Chemistry 26, (1996), pp. 1007–1018. No month and/or date provided.

Hobro et al., Recycling of Chromium from Metal Finishing Waste Waters Using Electrochemical Ion Exchange (EIX) pp. 173–183, 1994. No month and/or date provided.

Johnson et al., Desalting by Means of Porous Carbon Electrodes, Mar. 1971, pp. 510–517, J. Electrochem. Soc.; Electrochemical Technology vol. 118, No. 3.

Kedem et al., Reduction of Polarization by Ion–Conduction Spacers: Theoretical Evaluation of a Model System, 1978, pp. 143–156, Desalination, 27. No month and/or date provided.

Kedem et al., EDS–Sealed Cell Electrodialysis, 1983, pp. 291–299, Desalination 46. No month and/or date provided.

R. Simons, Electric Field Effects on Proton Transfer Between Ionizable Groups and Water in Ion Exchange Membranes, 1984, pp. 151–158, Electrochemica Acta, vol. 29, No. 2.

R. Simons, Strong Electric Field Effects on Proton Transfer Between Membrane–Bound Amines and Water, Aug. 1979, pp. 824–826, Nature, vol. 280.

R. Simons, The Origin and Elimination of Water Splitting in Ion Exchange Membranes During Water Demineralisation by Electrodialysis, 1979, pp. 41–42, Desalination, vol. 28. No month and/or date provided.

R. Simons, Water Splitting In Ion Exchange Membranes, 1985, pp. 275–282, Pergamon Press Ltd. No month and/or date provided.

V. Shaposhnik et al., Demineralization of Water by Electrodialysis with Ion–Exchanger Packing Between the Membranes, Jul. 1971, pp. 2815–2818, Voronezh Technological Institute.

Walters et al., Concentration of Radioactive Aqueous Wastes, Jan. 1955, pp. 61–67, Industrial and Engineering Chemistry.

A. Warshawsky, Thermally Regenerable Polymerable Polymeric Crown ethers. II Synthesis and Application in Electrodialysis, pp. 579–584. No month and/or date provided.

Farmer et al., Capacitive Deionization with Carbon Aerogel Electrodes, Strategic Environment Research & Development Program SERDP Project 436–94. No month and/or date provided.

International Search Report PCT US93/08745, dated Dec. 30, 1993.

International Search Report PCT US00/01666, dated Jun. 13, 2000.

* cited by examiner

ANION    CATION    DOPANT

ELECTRODEIONIZATION APPARATUS AND METHOD

BACKGROUND OF THE INVENTION

1. Field of the Invention

The present invention relates to an electrodeionization apparatus and method and, more particularly, to an electrodeionization apparatus and method including electroactive media combinations that provide more uniform electric current distribution, degree of resin regeneration, and deionization performance.

2. Description of the Related Art

Electrodeionization (EDI) is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices may comprise media of permanent or temporary charge, and may be operated batchwise, intermittently, or continuously. EDI devices may be operated to cause electrochemical reactions specifically designed to achieve or enhance performance, and may comprise electrically active membranes such as semipermeable ion exchange or bipolar membranes.

In continuous electrodeionization (CEDI), which includes processes such as continuous deionization, filled cell electrodialysis, or clectrodiaresis (EDR), the ionic transport properties of the electrically active media are the primary sizing parameter. These processes are described, for example, by Kollsman in U.S. Pat. No. 2,815,320; Pearson in U.S. Pat. No. 2,794,777; Kressman in U.S. Pat. No. 2,923,674; Parsi U.S. Pat. Nos. 3,149,061 and 3,291,713; Korngold et al. in U.S. Pat. No. 3,686,089; Davis in U.S. Pat. No. 4,032,452; U.S. Pat. No. 3,869,376; O'Hare in U.S. Pat. No. 4,465,573; Kunz in U.S. Pat. Nos. 4,636,296 and 4,687,561; and Giuffrida et al. in U.S. Pat. No. 4,632,745. A typical CEDI device comprises alternating electroactive semipermeable, anion and cation ion-exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction products from the electrodes can be separated from the other flow compartments. Upon imposition of the electric field, ions in the liquid are attracted to their respective counterelectrodes. The compartments bounded by the electroactive anion membrane facing the anode and the electroactive cation membrane facing the cathode become ionically depleted, and the compartments bounded by the electroactive anion membrane facing the cathode and the electroactive cation membrane facing the anode become ionically concentrated. The volume within the ion-depleting compartments, and preferentially within the ion-concentrating compartments, is also comprised of electrically active media. In continuous deionization devices, the media may comprise intimately mixed anion and cation exchange resins. The ion-exchange media enhances the transport of ions within the compartments and can also participate as a substrate for controlled electrochemical reactions. The configuration is similar in EDR devices, except that the media comprise separate, and sometimes alternating, layers of ion-exchange resin. In these devices, each layer is substantially comprised of resins of the same polarity (either anion or cation resin) and the liquid to be deionized flows sequentially through the layers.

Performance of CEDI may be limited by difficulty in obtaining the desired electrical current distribution with the device. Electroactive media of permanent charge may change their electrical resistance properties in undesired ways depending on their ionic form. For example in the ion substitution of sodium with hydrogen ion in EDR, most cation exchange resins will preferentially transport hydrogen ion over the desired transport of sodium ion. This results in electrical inefficiencies and, under certain circumstances, may cause pH shifts that are detrimental to valuable products within the liquid. In another example, a given electroactive media may be desirable for transport properties, such as the Type II anion membrane and resins for continuous deionization and EDR, but may have the undesirable properties of catalyzing the ionization reaction of water to hydrogen and hydroxide ions.

NL 776,469 discloses an electrolytic deionization apparatus that includes separate strata of anion exchanger and cation exchanger.

WO97/46492 discloses an electrodeionization apparatus for improving the rate of silica removal in which nontreated water first passes through an anion-exchange layer followed by other ion-exchange materials.

Therefore, a need remains for an improved electrodeionization apparatus having improved electric current distribution and deionization performance. Lastly, there is a need to provide improved methods of operation of an electrodeionization apparatus.

SUMMARY OF THE INVENTION

Accordingly, the present invention is directed to an electrodeionization apparatus including an ion-depleting compartment having alternating layers of ion exchange resin material. At least one of the alternating layers includes a specialized electroactive media, which includes a Type I anion resin material. At least one of the alternating layers includes a doped cation exchange resin material.

In another aspect, the present invention is directed to an electrodeionization apparatus that includes an ion-depleting compartment with alternating layers of ion exchange resin material. At least one of the alternating layers includes a specialized electroactive media. At least one of the alternating layers includes a doped cation exchange resin material. The cation resin material is doped with the specialized electroactive media. The specialized electroactive media includes about 60 percent of a Type I anion resin material.

In another aspect, the invention is directed to an electrodeionization apparatus that includes an ion-depleting compartment. The ion-depleting compartment includes alternating layers of ion exchange resin material. At least one layer includes a dopant material.

In yet another aspect, the invention is directed to a method for purifying a fluid in an electrodeionization apparatus. The method involves providing an electrodeionization apparatus having an ion-depleting compartment. The method also involves providing a first ion exchange resin material having a first conductivity value and a second ion exchange resin material having a second conductivity value different than the first. The difference between the first and second conductivity values may be reduced by adding a dopant material to at least one of the ion exchange resin materials. The first and second ion exchange resin materials are positioned in alternating layers in the ion-depleting compartment. A fluid stream is passed through the ion-depleting compartment, and an electric field is applied across the electrodeionization apparatus.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

The present invention is directed to an electrodeionization apparatus and method that provide relatively high purity water and low electrical resistance by balancing the relative conductivity of alternating layers of ion exchange resin material positioned in an ion-depleting compartment. The electrodeionization apparatus provides more uniform electric current distribution and deionization performance. An electrodeionization apparatus may be based on technologies such as continuous electrodeionization, electrodiaresis, filled-cell electrodialysis, electrochemical ion exchange, capacitive deionization, and the like. For purposes of the present invention, the electrodeionization apparatus is an EDI apparatus, such as those disclosed by Kunz, in U.S. Pat. Nos. 4,636,296 and 4,687,561, both of which are incorporated herein by reference. The electrodeionization apparatus may be based on various configurations, such as a spiral design, a plate and frame design, and a circular design.

The method of the invention involves layering various types of electroactive media, each having a different conductivity value, in an ion-depleting compartment. The conductivity of the alternating layers of ion exchange resin material are balanced in order to provide more uniform current distribution and, ultimately, improved deionization performance. For purposes of the present invention, the terms "balanced" or "balancing," mean a reduction in the difference in conductivity between two adjacent layers of electroactive media. One potential problem that may arise when the current distribution is unbalanced arises in instances where ion exchange resin materials are regenerated in situ by hydrogen and hydroxyl ions, as disclosed in co-pending U.S. patent application Ser. No. 08/747,505, filed Nov. 12, 1996 (now U.S. Pat. No. 5,858,191), which is incorporated herein by reference in its entirety. As disclosed, resin regeneration takes place where the majority of current flows, and little or no regeneration takes place elsewhere. Therefore, the more highly conductive resin will be regenerated, while the less conductive resin will only be minimally regenerated, or not regenerated at all, leading to fouling of the less conductive resin. In the present invention, the current distribution of the apparatus is balanced by doping at least one layer of the electroactive media. "Doped material," as used herein, means an electroactive media to which a dopant material has been added, for the purpose of adjusting the electrochemical characteristics of the electroactive media. The "dopant material" may be an inert or an electroactive media, preferably anion or cation exchange resin beads.

In conventional mixed bed, or mixtures of oppositely charged ion exchange resin materials, the mechanism of ion exchange is based on ionic transport. That is, ions of opposing charges are simultaneously transported from the deionization chamber in opposing directions. Such a mechanism does not take place in intimate mixtures of ion exchange materials having the same charge, or mixtures of a single charge and an inert material. That is, they will never act as a mixed bed. In contrast, in the present invention, ionic substitution predominates, the majority of current flows in one direction, and the ions of interest are transported in a single direction. Thus, for purposes of the present invention, an electroactive material may be considered "doped" up to the point at which the transport of ions in both directions is the predominant mechanism, i.e. until the electroactive material begins to function as a mixed bed. Those of skill in the art will recognize that mixed beds in which ionic transport ceases or is minimized and in which ionic substitution predominates may be considered doped materials for purposes of the present invention. Those of skill in the art will also recognize that the maximum amount of dopant that may be added to an electroactive media before ionic transport predominates will vary according to the materials used.

According to the invention, alternating layers of anion exchange resin beads and cation exchange resin beads may be positioned in the ion-depleting compartment, in any sequence. Examples of such electroactive media are used throughout the application, and are described in more detail below. That is, either anion exchange resin beads or cation exchange resin beads may be positioned in the first, or topmost, layer of the ion-depleting compartment. Moreover, either, or both layers of the beads may be doped. For ease of manufacturing, it is preferred that the layers are doped using beads from the alternating layers. For example, a layer of anion exchange resin beads is preferably doped with cation exchange resin beads of a type used in an adjacent layer. Conversely, a layer of cation exchange resin beads is preferably doped with anion exchange resin beads of a type used in an adjacent layer.

For ease of illustration, all embodiments and examples described herein are with reference to ion exchange resin beads. However, it should be understood that beads are used solely for the purposes of illustration, and that the invention encompasses any other type of electroactive media.

In FIGS. 1A–1F, varying schematic, cross-sectional views of an ion-depleting compartment 10 according to the present invention are shown. According to the embodiments, alternating layers, or beds, of ion exchange resin material are positioned in the ion-depleting compartment 10 in a central space formed between an anion-permeable membrane 26 and a cation-permeable membrane 24. The central space, or inter-membrane spacing, may be varied depending on the desired purity of the product water. The inter-membrane spacing may be adjusted depending on the desired product water purity, and is typically greater than about 1/16 inch. In one application requiring very high purity water, for example, having a resistivity of between about 16 megohms to about 18 megohms, it has been found that the preferred inter-membrane spacing is in the range of about 1/16 inch to about 3/16 inch, and most preferably about 1/8 inch. In another application with a lower purity requirement, for example, having a resistivity of between about 9 megohms to about 12 megohms, it has been found that the preferred inter-membrane spacing is in the range of about 1/4 inch to about 1/2 inch, most preferably about 3/8 inch.

At least one layer of ion exchange resin material 28 and ion exchange resin material 30 is required in the ion-depleting compartment of the present invention, although more may be used. The number of layers in the ion-depleting compartment may be determined, in part, by the height of the module frame. The thickness of the layers may vary depending, in part, on the inter-membrane spacing. In practice, the layer thickness, which is also known as the bed height, is limited by the minimum thickness required to reduce shifting and undesired mixing of the alternating layers of resins during use. In some instances, it may be necessary to vary the thickness of the alternating layers, however, it is preferred that the individual layers in the ion-depleting compartment have substantially the same thickness. Although as few as two alternating resin layers may be used in the ion-depleting compartment, up to eight or more resin layers of equal or different heights are typically used.

Figure 1A:
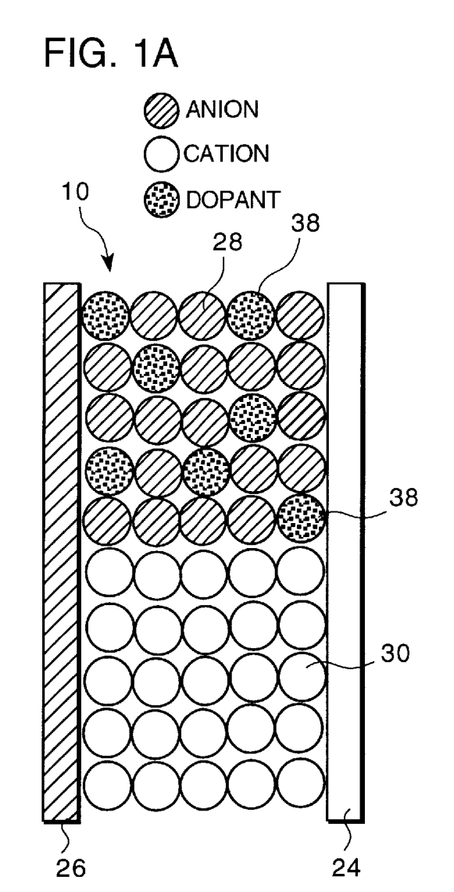
FIG. 1A is a schematic, cross-sectional view through an ion-depleting cell according to the present invention, illustrating one configuration of alternating ion exchange resin material layers.
Figure 1B:
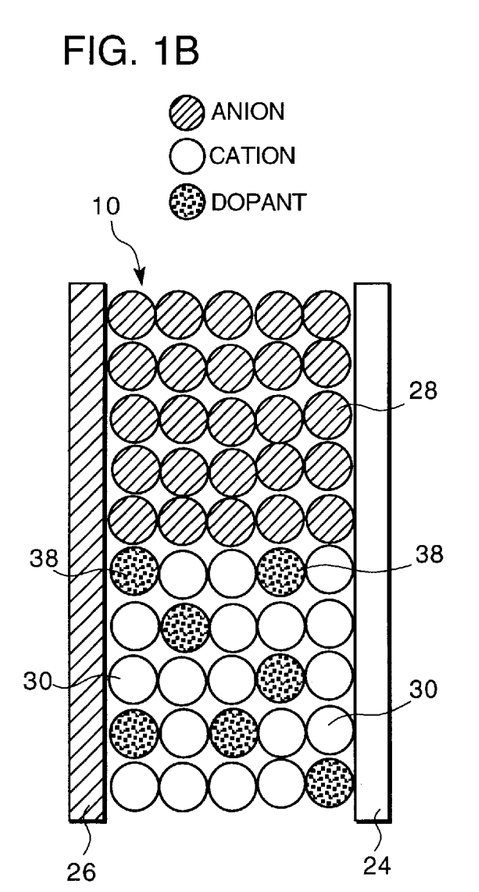
FIG. 1B is a schematic, cross-sectional view through an ion-depleting cell according to the present invention, illustrating another configuration of alternating ion exchange resin material layers.
Figure 1C:
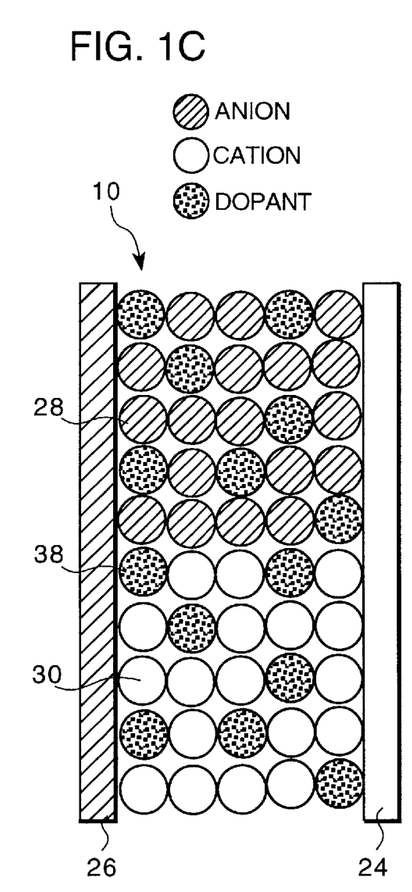
FIG. 1C is a schematic, cross-sectional view through an ion-depleting cell according to the present invention, illustrating another configuration of alternating ion exchange resin material layers.

In one aspect of the invention illustrated in FIGS. 1A–1C, the first, or topmost layer, is preferably an anion exchange resin material 28, and the second layer is preferably a cation exchange resin material 30. In one embodiment illustrated in FIG. 1A, the first layer of anion exchange resin material 28 is preferably doped with a dopant material 38, while the second layer of cation exchange resin beads 30 is preferably undoped. Conversely, in another embodiment illustrated in FIG. 1B, the first layer of anion exchange resin material 28 is preferably undoped, while the second layer of cation exchange resin material 30 is preferably doped with a dopant material 38. In another embodiment illustrated in FIG. 1C, both the first anion exchange resin material layer 28 and the second cation exchange resin material layer 30 are preferably doped with dopant material 38.

Figure 1D:
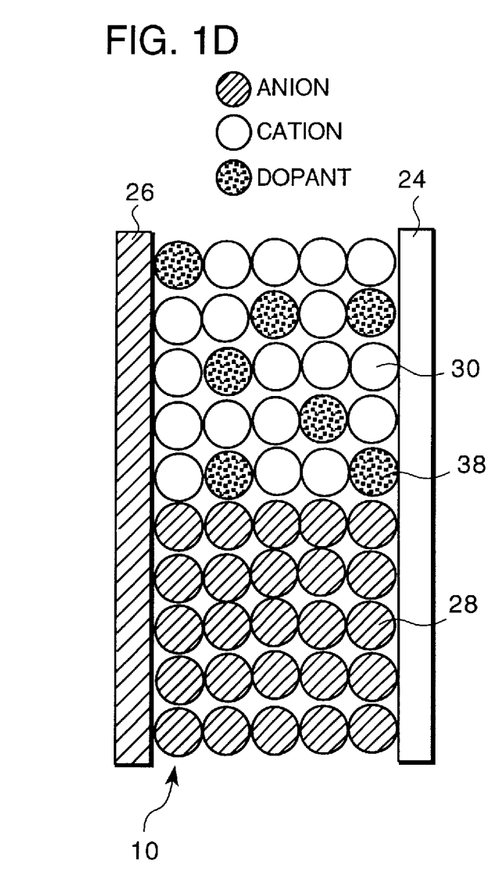
FIG. 1D is a schematic, cross-sectional view through an ion-depleting cell according to the present invention, illustrating another configuration of alternating ion exchange resin material layers.
Figure 1E:
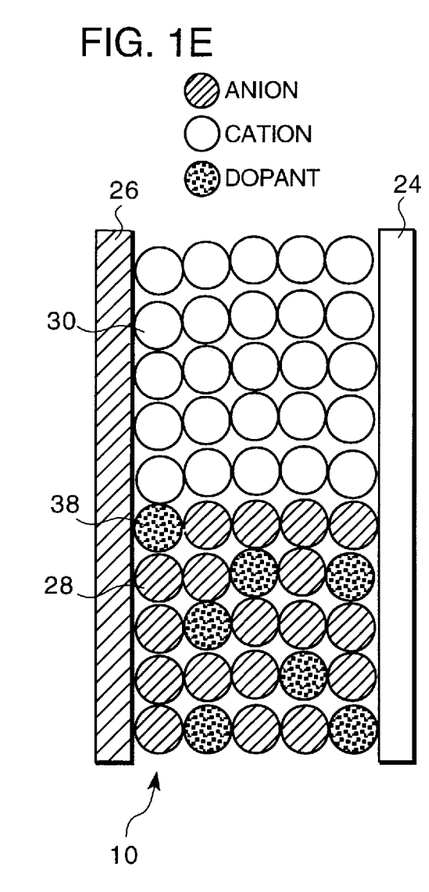
FIG. 1E is a schematic, cross-sectional view through an ion-depleting cell according to the present invention, illustrating another configuration of alternating ion exchange resin material layers.
Figure 1F:
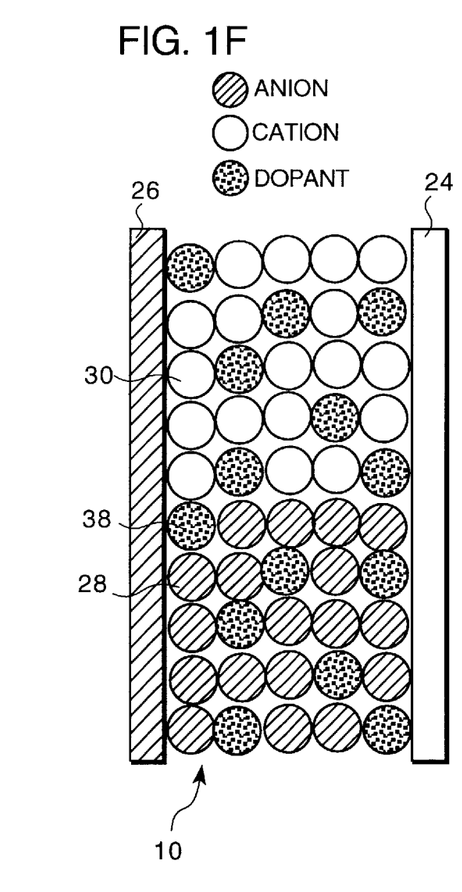
FIG. 1F is a schematic, cross-sectional view through an ion-depleting cell according to the present invention, illustrating another configuration of alternating ion exchange resin material layers.

FIGS. 1D–1F illustrate another aspect of the invention, in which the first, or topmost layer in the ion-depleting compartment is a cation exchange resin material 30, and the second layer is an anion exchange resin material 28. In one embodiment illustrated in FIG. 1D, the first cation exchange resin material layer 30 is preferably doped with a dopant material 38, while the second anion resin material layer 28 is preferably undoped. Conversely, in another embodiment illustrated in FIG. 1E, the first cation exchange resin material layer 30 is preferably undoped, while the second anion exchange resin material 28 is preferably doped with a dopant material 38. In another embodiment illustrated in FIG. 1F, both the first cation exchange resin material layer 30 and the second anion exchange resin material layer 28 are preferably doped with dopant material 38. When either, or both, of the alternating layers are doped, they may be doped with the same dopant material, or they may be doped with different dopant materials. Preferably, when either, or both, of the alternating layers of ion exchange resin material 28 and 30 are doped, they are doped with less than about 50 percent, more preferably less than about 40 percent, more preferably less than about 30 percent, more preferably less than about 20 percent, and more preferably still less than about 10 percent, of a dopant material, by volume of the layer to be doped. As noted above, the dopant material may be an inert or an electroactive media, preferably anion or cation exchange resin beads.

The optimum ratios of dopant material to ion exchange resin beads may vary based, in part, on the inter-membrane spacing, the thickness of the layers, the composition of both the dopant material and the ion exchange resin beads to be doped, the size and uniformity of the beads, and the functional groups in the surface regions of the beads. It will be readily apparent to those of skill in the art that as the difference in conductivity between two resins increases, the amount of resin required to effect a change in the conductivity of the ion exchange resin material may increase. In some instances, it may be desirable to minimize the amount of dopant material in order to prevent or minimize changes in the properties of the ion exchange resin material to which it is added.

Also in any of the embodiments disclosed herein, the remaining ion-concentrating and electrode compartments may be filled with conventional ion exchange resin material, which may be alternated as in the ion-depleting compartment. These compartments may also be filled with an inert material, such as, but not limited to, polypropylene. Alternatively, the remaining ion-concentrating and electrode compartments may have an inert structure, such as a screen or netting positioned therein. It should be recognized that any type of electroactive media may be used in the ion-concentrating and electrode compartments, including, but not limited to cation exchange resin material, Type I anion exchange resin material, Type II anion exchange resin material, weak base anion exchange resin material, synthetic materials, including carbon, zeolite resin material, inert materials, and mixtures thereof, which are described in more detail below. An inert material may be formed from any material which does not conduct current or take part in water dissociation, while permitting fluid flow to pass through the ion-depleting cell. However, deionization performance will vary depending on the choice of resin material used in such compartments. It will be apparent to those of ordinary skill in the art that optimum conductivity and deionization performance will be obtained by using any type of material that achieves the highest conductivity or lowest resistivity across the apparatus, in combination with the best deionization performance. Therefore, a simple test for selecting the best material to use is to determine which type of material provides the highest conductivity, or lowest resistivity, through the module. Those of ordinary skill in the art may accomplish this through routine experimentation. The arrangement of alternating layers in the ion-concentrating compartment, in addition to the alternating layers in the ion-depleting compartment, would eliminate a direct path of current flow from electrode to electrode through the material with a higher conductivity and enhance the uniformity of the electric current distribution throughout the module.

Generally, in any of the embodiments disclosed herein, it is advantageous to use the smallest possible bead diameter in order to maximize the available surface area of the electroactive media. However, one of ordinary skill in the art will recognize that smaller beads result in increased pressure drops across the ion-depleting chamber, which decreases operating efficiency. Therefore, the minimum size of the beads is limited by the maximum acceptable pressure drop across the ion-depleting compartment, which may vary depending on the apparatus design. One of ordinary skill in the art would be able to select the size of the beads through routine experimentation, using the deionization performance as the determining factor.

Also according to any of the embodiments disclosed herein, deionization performance may be improved further by using substantially uniformly sized ion exchange resin beads in the alternating layers positioned in the ion-depleting compartment. "Substantially uniform," as used herein with reference to the bead size, means that 90 percent of the beads are within +/−10 percent of the mean bead size, and that the relative average size of one ionic form of beads to a second ionic form of beads in a mixture of beads is at least 0.8. When beads are packed within a chamber, the packing density and size of voids between the beads will vary depending on the volume to be filled, as well as the size and uniformity of the beads. When non-uniform beads are used, the beads are typically packed more tightly in some areas, resulting in a variety of void sizes or volumes, with the void volumes varying within the chamber. Consequently, current may travel through the more tightly packed areas, resulting in non-uniform current distribution. In contrast, when uniform beads are used, the beads are packed more uniformly throughout the chamber volume, resulting in more uniformly sized voids throughout the chamber volume, and ultimately providing more uniform current distribution. It should be understood that as the ratio of substantially uniform beads to non-uniform beads increases, greater increases in deionization performance are achieved. That is, it is not necessary to use 100 percent substantially uniform beads in order to achieve benefits in deionization performance.

Commercially available examples of electroactive media in the form of ion exchange resin materials include, but are not limited to, DOWEX™ MARATHON™ series resins, (e.g., DOWEX™ MARATHON™ C cation resins, MARATHON™ A and MARATHON™ A2 anion resins), DOWEX™ WBA (weak base) anion resins, DOWEX™ 11 Type I anion resin, DOWEX™ SAR anion resin (e.g., DOWEX™ SAR Type II anion resins). Other commercially available examples of ion exchange resins include the AMBERJET™ series resins (trademark of Rohm & Haas Corporation, Philadelphia, Pa.), such as, for example, AMBERJET™ 4600 Type II anion resins. DOWEX™ MARATHON™ C cation resin is a gel-type strong acid cation exchange resin with sulfonic acid functional groups. DOWEX™ MARATHON™ A is a gel-type strong base Type I anion exchange resin with quaternary ammonium functional groups. DOWEX™ MARATHON™ A2 is a gel-type strong base Type II anion exchange resin with dimethyl ethanolamine functional groups. One particularly preferred example of ion exchange resin material is the DOWEX™ MARATHON™ MSA and MSC series resins. DOWEX™ MARATHON™ MSA is a high capacity, macro porous type I strong base anion exchange resin having functional groups and mean particle sizes ranging from 590 to 690 microns. The DOWEX™ MARATHON™ MSC ion exchange resin is a high capacity macro porous strong acid count ion exchange resin having sulfonic acid functional groups and uniform particle sizes ranging from 450 to 570 microns. Both the DOWEX™ MARATHON™ MSA and MSC ion exchange resin are characterized by high water content, high degree of cross-linking, therefore are advantageous for removing silica and are also advantageous for CDI applications.

Other commercially available examples of ion exchange resin materials having substantially uniform beads include DOWEX™ MONOSPHERE™ 650C cation resin (Dow Chemical Company), having an average bead size of about 650 microns, and DOWEX™ MONOSPHERE™ 550A Type I anion resin (Dow Chemical Company), having an average bead size of about 550 microns.

Other types of electroactive media include, but are not limited to, zeolite resin material, synthetic activated carbons, hypercrosslinked sorbent resins such as PUROLITE™ HYPERSOL-MACRONET™ sorbent resins (trademarks of Purolite Company, Bala Cynwyd, Pa.), synthetic carbonaceous adsorbents, such as AMBERSORB™ carbonaceous adsorbents (trademark of Rohm & Haas Corporation) and G-BAC™ adsorbents (trademark of Kureha Chemical Industry Co., Ltd., Japan), polymeric adsorbent resin beads that are prepared by alkyline bridging haloalkylated, porogen-modified, cross-linked copolymer beads, having microporosities in the range of about 0.2 and 0.5 $cm^3$/cm, mesoporosities of at least about 0.5 $cm^3$/g, and total porosity of at least about 1.5 $cm^3$/g as disclosed, for example, by Stringfield, in U.S. Pat. No. 5,460,725, and catalytic carbon as disclosed, for example, by Hayden, in U.S. Pat. No. 5,444,031, and Matviya et al., in U.S. Pat. No. 5,356,849.

Figure 2:
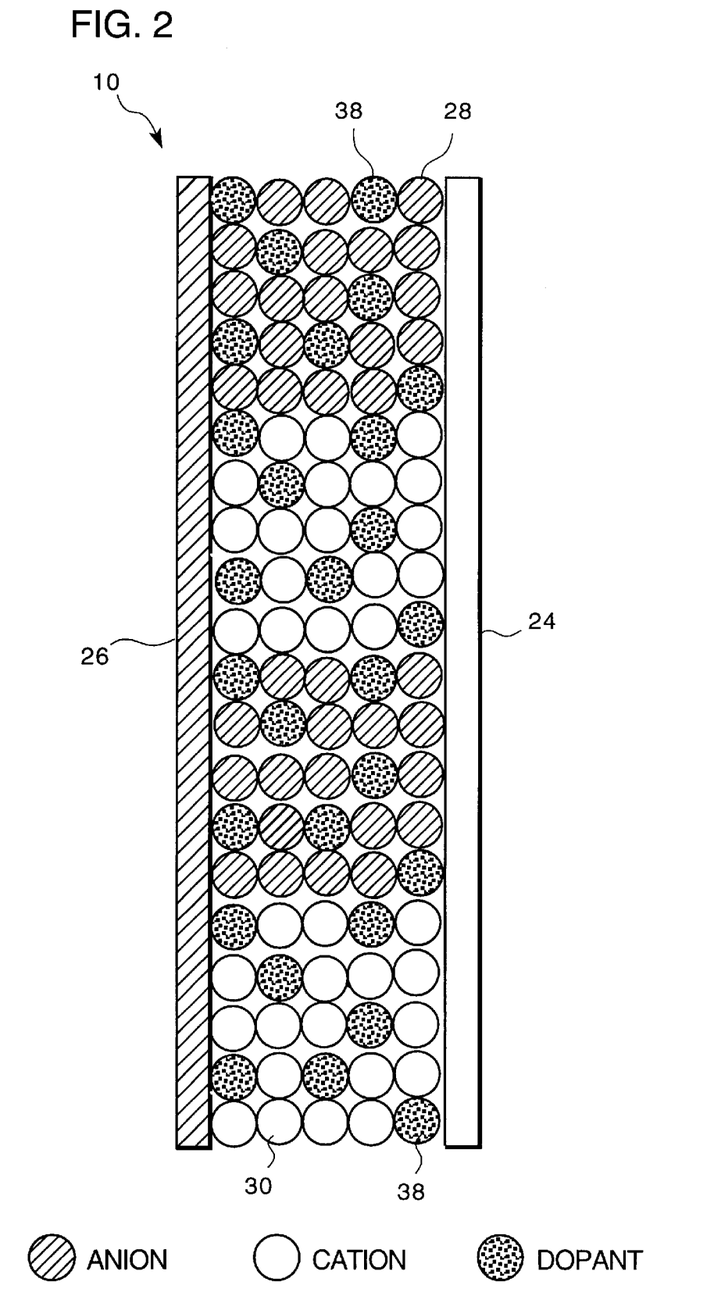
FIG. 2 is a schematic, cross-sectional view through an ion-depleting cell according to the present invention, illustrating an embodiment having substantially uniformly sized alternating ion exchange resin material layers.

In FIG. 2, a schematic, cross-sectional view of a preferred ion-depleting compartment according to the present invention is shown. In the present embodiment, alternating layers, or beds, of ion exchange resin material 28 and 30 are positioned within the ion-depleting compartment 10 in a central space formed between an anion-permeable membrane 26 and a cation-permeable membrane 24. In the present embodiment, four alternating ion exchange resin layers are positioned in the ion-depleting compartment. Also in the present embodiment, the inter-membrane spacing is preferably in the range of about ¼ inch to ⅜ inch, and the layer thickness is between about 2 inches to about 4 inches.

In the present embodiment, the ion-depleting compartment 10 preferably includes a layer of anion exchange resin beads 28, which are alternated with a layer of cation exchange resin beads 30 within the central space formed between the anion-permeable membrane 26 and the cation-permeable membrane 24 of ion-depleting compartment 10. Preferably, the size of the anion and cation resin beads used in the present embodiment ranges from between about 200 $\mu$m and about 800 $\mu$m; more preferably, between about 400 and about 700 $\mu$m; and more preferably between about 550 $\mu$m and about 650 $\mu$m. Preferably, the anion exchange resin beads are a specialized electroactive media, such as described in co-pending U.S. patent application Ser. No. 08/717,781, filed on Sep. 23, 1996, which is hereby incorporated by reference. For ease of manufacturing, it is preferred that the cation exchange resin beads are doped with the same anion exchange resin material as used in the alternating layers. One such preferred specialized electroactive medium is an anion exchange resin material that includes between about 1 percent and about 20 percent; more preferably, between about 5 percent and about 15 percent; and, most preferably, about 10 percent, by volume, of Type II or weak base anion exchange resin material, with the remainder comprising Type I anion exchange resin material. In a preferred embodiment, the anion exchange resin material layers include about 90 percent Type I anion exchange resin material and about 10 percent Type II anion exchange resin material, and the cation exchange resin layers are doped with about 22.5 percent of the Type I anion exchange resin material and 2.5 percent Type II anion exchange resin material, by volume of the layer. When uniformly sized resin beads are used, the cation exchange resin material layers preferably include about 36 percent Type I anion exchange resin material and about 4 percent Type II anion exchange resin material, by volume of the layer.

The layer of doped cation exchange resin material 30 in the ion-depleting compartment 10 preferably includes between about 50 percent and about 99 percent, by volume, of cation exchange resin material, which is doped with between about 1 percent and about 50 percent, by volume, of anion exchange resin material; more preferably, between about 60 percent and about 90 percent, by volume, of a cation exchange resin material, which is doped with between 10 percent and about 40 percent, by volume, of anion exchange resin material; and more preferably, between about 70 percent and about 80 percent, by volume, of a cation exchange resin material, which is doped with between about 20 percent and about 30 percent of anion exchange resin material, by volume, based on the volume of the layer. That is, the doped cation exchange resin layers 30, according to this aspect of the invention, preferably include between about 50 percent and about 99 percent cation exchange resin material, which are doped with between about 0.1 percent and about 5 percent of Type II anion exchange resin material, and between about 0.9 percent and about 45 percent Type I anion exchange resin material; more preferably, between about 60 percent and about 90 percent cation exchange resin material, which is doped with between about 1 percent and about 4 percent of Type II anion exchange resin material, and between about 9 percent and about 36 percent Type I anion exchange resin material; more preferably, about 70 percent to about 80 percent cation exchange resin material, which is doped with between about 2 percent and about 3 percent of Type II anion exchange resin material, and between about 18 percent and about 27 percent Type I anion exchange resin material, by volume, based on the volume of the layer.

In any of the disclosed embodiments, as the amount of Type II or weak base anion exchange resin material in the specialized electroactive media increases, the ability of the media to dissociate in solutions along the entire pH range and to split and exchange neutral salts decreases due to the decrease in volume of Type I anion exchange resin material in the layer. Therefore, when using the previously described specialized electroactive media, as in the present embodiment, balancing the conductivity of the alternating layers of cation exchange resin materials and anion exchange resin materials, by decreasing the conductivity of the layers of cation exchange resin beads, so as not to affect the properties of the anion exchange resin beads used in the layers, has been found to be more preferable than doping the layers of anion exchange resin beads.

Figure 3A:
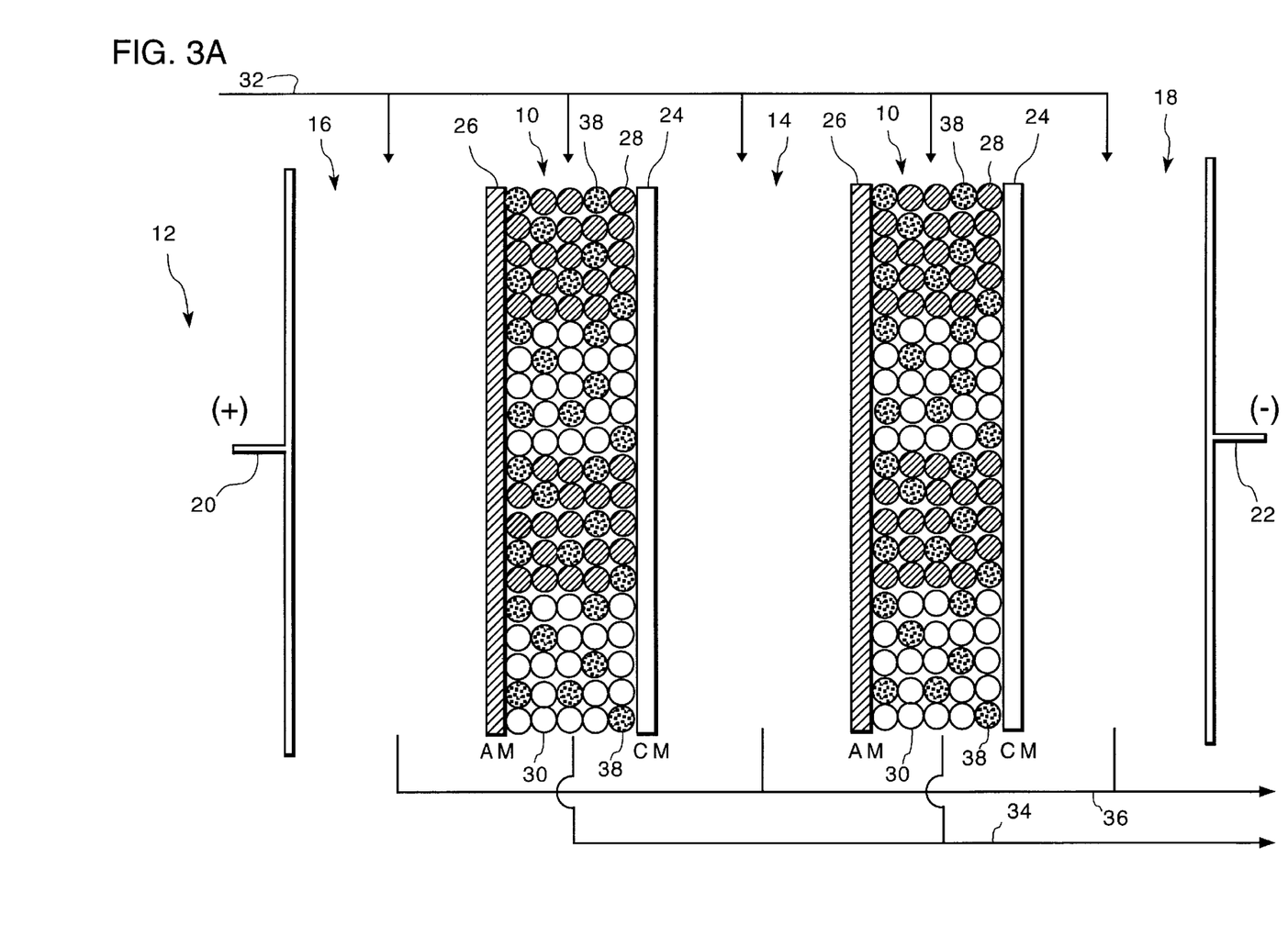
FIG. 3A is a schematic, cross-sectional view through an electrodeionization apparatus, illustrating the fluid and ion flow direction through ion-depleting, ion-concentrating, and electrolyte compartments.

FIG. 3A illustrates schematic, cross-sectional views of the fluid and ion flow paths through one preferred EDI apparatus of the invention. In FIG. 3A, the EDI module 12 includes ion-depleting compartments 10 and an ion-concentrating compartment 14 positioned between the ion-depleting compartments. The ion-depleting compartments 10 are bordered by an anolyte compartment 16 and a catholyte compartment 18. Typically, end blocks are positioned adjacent to end plates (not shown) to house an anode 20 and a cathode 22 in their respective compartments. Cation-selective membranes 24 and anion-selective membranes 26 are typically sealed to the periphery of both sides of the compartments. Alternating layers, or beds, of ion exchange resin material 28 and 30 are positioned within the ion-depleting compartment 10 in a central space formed between the cation-permeable membrane 24 and the anion-permeable membrane 26. The ion-depleting compartment 10 is illustrated, as in FIG. 2, with four alternating ion exchange resin layers positioned therein, and with an inter-membrane spacing in the range of about ¼ inch to about ½, more preferably about ⅜ inch, and a layer thickness or bed height of between about 2 inches to about 4 inches. In any of the disclosed embodiments, the ion-concentrating and electrode compartments may be empty or may be filled with other types of electroactive media. The electrode compartments and the ion-concentrating compartments of the EDI apparatus illustrated in FIG. 3A do not contain any electroactive media positioned therein. However, if desired, one or both of the electrode and ion-concentrating compartments may contain any of the electroactive media described herein.

Figure 3B:
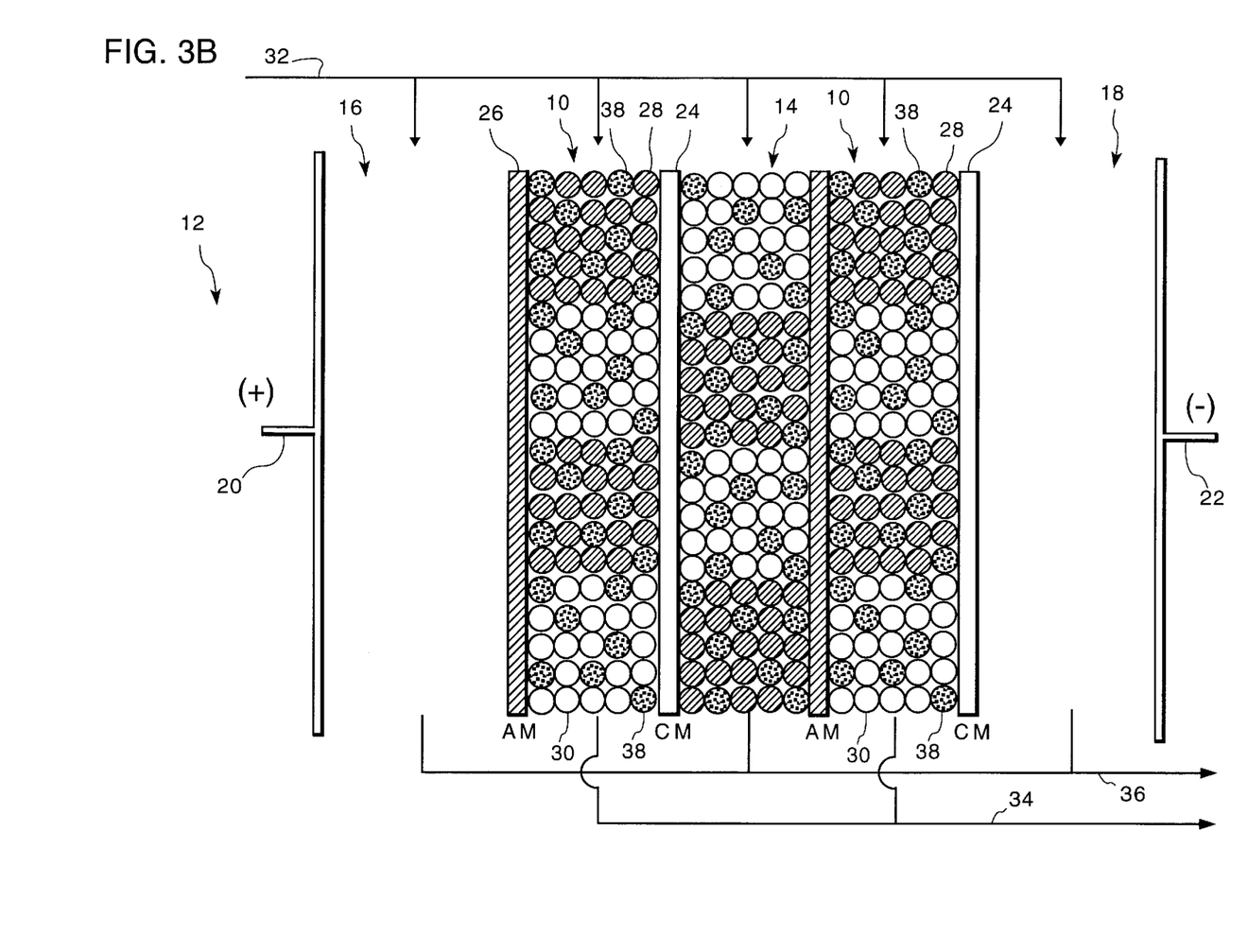
FIG. 3B is a schematic, cross-sectional view through the electrodeionization apparatus of FIG. 3A, in which the ion-concentrating compartment is filled with alternating layers of ion exchange resin beads.

Alternatively, as illustrated in FIG. 3B, which is a schematic, cross-sectional view through the electrodeionization apparatus of FIG. 3A, the ion-concentrating compartment is filled with alternating layers of ion exchange resin beads, as in the ion-depleting compartment. In FIG. 3B, the first and third layers of the ion-concentrating compartment are doped cation resin material, and the second and fourth layers are the specialized electroactive media described previously.

Figure 3C:
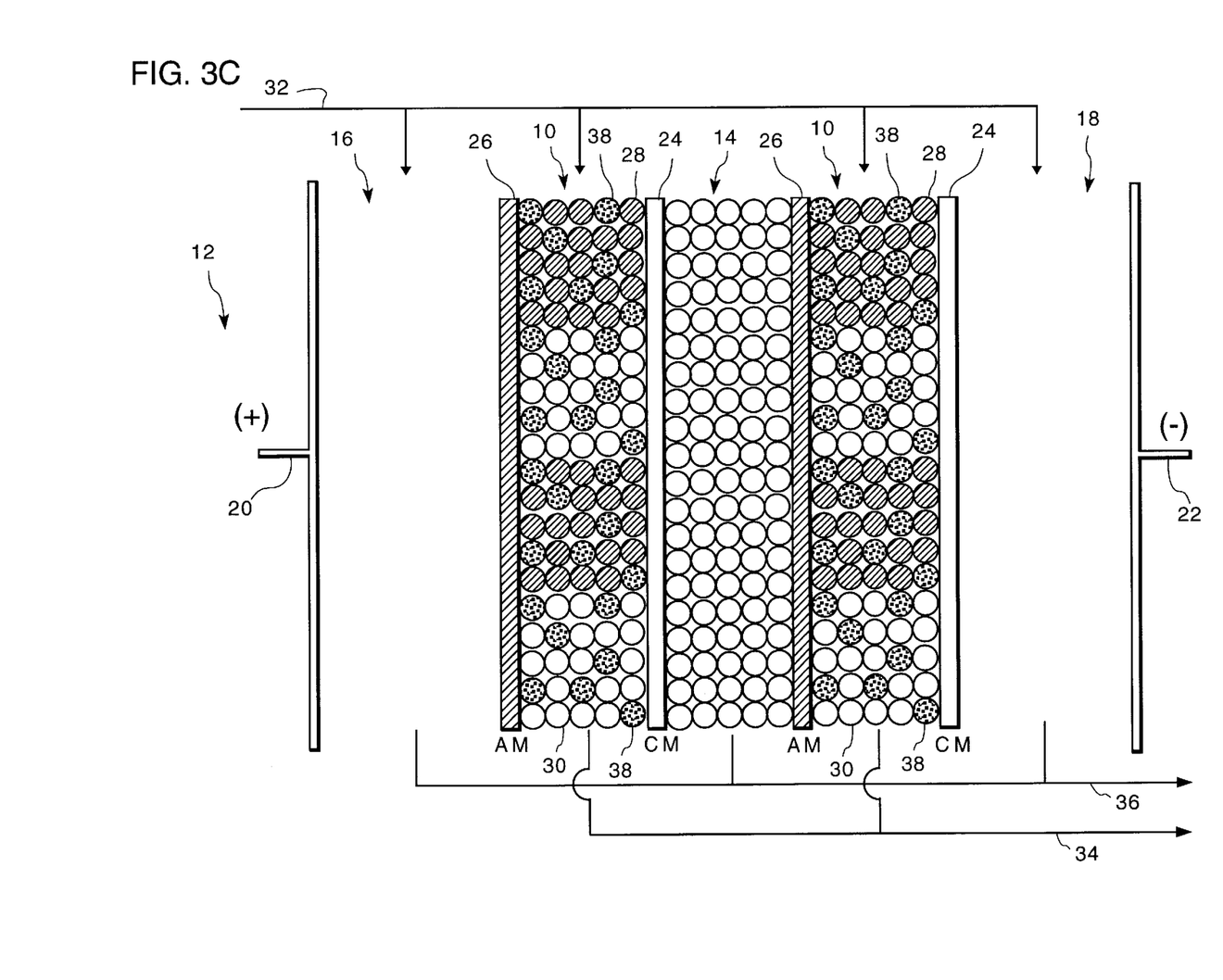
FIG. 3C is a schematic, cross-sectional view through the electrodeionization apparatus of FIG. 3A, in which the ion-concentrating compartment is filled with uniformly sized cation exchange resin beads.

FIG. 3C is a schematic, cross-sectional view of a preferred electrodeionization apparatus as illustrated in FIG. 3A, in which the ion-concentrating compartment is filled with uniformly sized cation exchange resin beads. Preferably, the ion-concentrating compartment is filled with a strong acid cation exchange resin material, preferably including sulfonic acid functional groups. One such commercially available cation exchange resin material is DOWEX™ MONOSPHERE™ 650C (not shown), which includes uniformly sized resin beads.

In operation, a liquid to be purified 32, which may be a reverse osmosis product stream, typically having dissolved cationic and anionic components, is fed through the ion-depleting compartments 10, wherein the anionic components are attracted to the anion exchange resin 28 and the cationic components are attracted to the cation exchange resin beads 30. An electric field is then applied across the anode 20 and cathode 22 at the opposite ends of the module. The electric current passes perpendicularly to the fluid flow such that the dissolved cationic and anionic components migrate from the alternating ion exchange resin layers in the direction of their corresponding electrode. Cationic components migrate through the cation-permeable membrane 24 into the adjacent ion-concentrating compartment 14. An anion-permeable membrane on the opposite side of the ion-concentrating compartment prevents further migration, thereby trapping the cationic components in the ion-concentrating compartment. The process for the anionic components is similar but occurs in the opposite direction; anionic components migrate through the anion-permeable membrane 26 into the ion-concentrating compartment 14 and a cation-permeable membrane 24 on the other side of the ion-concentrating compartment prevents further migration to trap the anionic components in the ion-concentrating compartment. Ionic components are depleted from the ion-depleting compartments 10 and increased in the ion-concentrating compartments 14, forming a high purity product stream 34 and a concentrate stream 36.

The electrodeionization apparatus may be operated under conditions of chemical solute, or temperature cycling, and/or electrical field polarity cycling or reversal, as described in application Ser. No. 08/717,781 now U.S. Pat. No. 5,868,915.

The present invention will be further illustrated by the following examples, which are intended to be illustrative in nature and are not to be considered as limiting the scope of the invention.

EXAMPLES

The following examples were performed in a electrodeionization apparatus that included an ion-depleting compartment, and ion-concentrating compartment, and anolyte compartment, and a catholyte compartment. Each compartment was bounded by a resin sheet membrane, with an inter-membrane spacing of about ⅜ inch. Alternating layers of ion exchange resin material were positioned in the ion-depleting compartments of the electrodeionization apparatus. Each ion-depleting compartment contained four alternating layers, beginning with a layer of anion exchange resin beads. The bed height, or layer thickness, ranged from about 2 inches to about 4 inches.

A reverse osmosis permeate stream, having a conductivity of about 3.0 to about 5.0 $\mu$S/cm, at a temperature of between about 18° C. and about 20° C., was used as the feed in each example. The modules were operated at a flow rate of about 1.6 lpm/cell-pair, with a product recovery of about 85 percent. The applied DC amperage to the module was 1.5 A, which corresponded to a current density of about 3 mA/cm$^2$.

Example I

The effectiveness of an electrodeionization apparatus in which the conductivity of the ion-exchange materials in the ion-depleting compartments was balanced according to the present invention, was compared to an electrodeionization apparatus in which the conductivity of the ion-exchange materials in the ion-depleting compartment was not balanced.

Two twelve-cell-pair modules were used for the experiments (Modules A and B). The ratios of the materials used in each module are outlined below in Table 1. Each ion-depleting compartment contained four alternating layers, beginning with a layer of substantially uniform anion exchange resin beads. The anion exchange resin beads used in the alternating layers of each ion-depleting compartment contained 90 percent of substantially uniform Type I anion exchange resin beads (DOWEX™ MONOSPHERE™ 550A) and 10 percent of uniform Type II anion exchange resin beads (AMBERJET 4600). The layer of cation exchange resin beads used in the alternating layers of Module A were undoped strong acid cation exchange resin beads (DOWEX™ MONOSPHERE™ 650C), also having a substantially uniform bead size. In Module B, the cation layers were doped in order to balance the conductivity of the alternating layers. The layers of cation exchange resin beads used in the alternating layers of Module B were doped using about 40 percent of the anion exchange resin beads used in the layers of both Module A and Module B. (i.e., the layers included 60 percent of the uniform strong acid cation resin (DOWEX™ MONOSPHERE™ 650C), 36 percent of the uniform Type I anion exchange resin beads (DOWEX™ MONOSPHERE™ 550A), and 4 percent of a Type II anion exchange resin beads (AMBERJET 4600).

TABLE 1

|  | Type I Anion Exchange Resin Beads | Type II Anion Exchange Resin Beads | Cation Exchange Resin Beads |
| --- | --- | --- | --- |
| Module A Layers |  |  |  |
| First | 90% uniform | 10% uniform | 0% |
| Second | 0% | 0% | 100% uniform |
| Third | 90% uniform | 10% uniform | 0% |
| Fourth | 0% | 0% | 100% uniform |
| Module B Layers |  |  |  |
| First | 90% uniform | 10% uniform | 0% |
| Second | 36% uniform | 4% uniform | 60% uniform |
| Third | 90% uniform | 10% uniform | 0% |
| Fourth | 36% uniform | 4% uniform | 60% uniform |

The performance of Module A and Module B was evaluated with regard to the product resistivity, product pH, and electrical resistance, recorded after reaching a steady state of operation. As shown below in Table 2, the electrical resistance of Module A was lower than Module B, the pH of the product from Module A was slightly acidic, and the product resistivity of Module A was lower than Module B. When the cation exchange resin beads were not doped, as in Module A, the conductivity of the alternating layers was less balanced, and more of the current traveled through the relatively highly conductive cation resin layers. In contrast, when the cation exchange resin beads were doped, as in Module B, current was more evenly distributed through the module, resulting in improved deionization performance.

TABLE 2

| Module | Product Resistivity (M$\Omega$-cm) | Product pH | Electrical Resistance ($\Omega$) |
| --- | --- | --- | --- |
| A | 0.16 | <7.0 | 8.53 |
| B | 15.4 | ~7.0 | 28.3 |

Example II

The effectiveness of the electrodeionization apparatus of the present invention was evaluated with respect to an electrodeionization apparatus utilizing non-uniform anion exchange resin beads.

Three six-cell-pair modules were used for the experiments (Modules A, B, and C). Each ion-depleting compartment contained four alternating layers, beginning with a layer of anion exchange resin beads. The anion exchange resin beads used in the alternating layers of each ion-depleting compartment contained 90 percent of non-uniform Type I anion exchange resin beads (DOWEX™ 11, non-uniform grade) and 10 percent of uniform Type II anion exchange resin beads (AMBERJET 4600). The cation resin beads used in the alternating layers of Module A were substantially uniform undoped strong acid cation exchange resin beads (DOWEX™ MONOSPHERE™ 650C). Thus, the only difference between Module A of the present example and Module A of Example I is that the majority of beads used in Example I were substantially uniform. Modules B and C included alternating layers of doped cation exchange resin beads, according to the present invention, in order to balance the conductivity of the alternating layers. The doped cation exchange resin beads used in the alternating layers of Module B contained 60 percent of the uniform strong acid cation resin (DOWEX™ MONOSPHERE™ 650C) and 40 percent of the same anion exchange resin beads used in the alternating layers of Modules A, B, and C ((i.e. 60 percent uniform strong acid cation resin beads (DOWEX™ MONOSPHERE™ 650C), 36 percent of the non-uniform Type I anion exchange resin beads (DOWEX™ 11, non-uniform grade), and 4 percent uniform Type II anion exchange resin beads (AMBERJET 4600)). Module C contained the same type of resins as Module B, but the doping ratio of the cation resin beads was less. Accordingly, the layers of cation exchange resin beads used in the alternating layers of Module C contained the same uniform strong acid cation resin beads (DOWEX™ MONOSPHERE™ 650C), doped with about 25 percent of the same anion exchange resin beads in the alternating layers of the Module ((i.e. 75 percent uniform strong acid cation resin beads (DOWEX™ MONOSPHERE™ 650C), 22.5 percent of a non-uniform Type I anion exchange resin beads (DOWEX™ 11, non-uniform grade), and 2.5 percent of a uniform Type II anion exchange resin beads (AMBERJET 4600)).

TABLE 3

| | Type I Anion Exchange Resin Beads | Type II Anion Exchange Resin Beads | Cation Exchange Resin Beads |
|---|---|---|---|
| Module A Layers | | | |
| First | 90% non-uniform | 10% uniform | 0% |
| Second | 0% | 0% | 100% uniform |
| Third | 90% non-uniform | 10% uniform | 0% |
| Fourth | 0% | 0% | 100% uniform |
| Module B Layers | | | |
| First | 90% non-uniform | 10% uniform | 0% |
| Second | 36% non-uniform | 4% uniform | 60% uniform |
| Third | 90% non-uniform | 10% uniform | 0% |
| Fourth | 36% non-uniform | 4% uniform | 60% uniform |
| Module C Layers | | | |
| First | 90% non-uniform | 10% uniform | 0% |
| Second | 22.5% non-uniform | 2.5% uniform | 75% uniform |
| Third | 90% non-uniform | 10% uniform | 0% |
| Fourth | 22.5% non-uniform | 2.5% uniform | 75% uniform |

The performance of Modules A, B, and C was evaluated with regard to the product resistivity, product pH, and electrical resistance, recorded after reaching a steady state of operation. As shown below in Table 4, Module A, in which the conductivity of the alternating layers was not balanced, had the lowest product resistivity and electrical resistance, with slightly acidic product water. Module B, which had the same ratios of resins as used in Module B of the previous Example, but used non-uniform resins, had very low product resistivity, the highest electrical resistance, and slightly basic product water. Module C had the best deionization performance, with very high product resistivity, relatively high electrical resistance, and a neutral pH.

TABLE 4

| Module | Product Resistivity (MΩ-cm) | Product pH | Electrical Resistance (Ω) |
|---|---|---|---|
| A | 0.12 | <7.0 | 8.5 |
| B | 3.42 | >7.0 | 16.5 |
| C | 16.3 | ~7.0 | 14.8 |

The results of the modules that were balanced according to the present invention in both Experiment I and II are summarized and compared below in Table 5. The only difference between Module B of Experiments I and II is the uniformity of the material used to dope the cation exchange resin beads, i.e., the majority of anion exchange resin beads used in Experiment I were substantially uniform and the majority of anion exchange resin beads resins used in Experiment II were non-uniform. Comparing the results of the two Modules shows that as a result of the substitution of the non-uniform beads, the product resistivity dropped, and the pH of the product became slightly basic, indicating less cation removal. Therefore, it may be concluded that a 4 to 5 fold increase in product resistivity is achieved when the conductivity of the alternating layer is balanced by doping with substantially uniform beads. The only difference between Modules B and C of Experiment II is the ratio of dopant material in the layers of cation exchange resin beads. In Module B, the ratio was 40 percent dopant material to 60 percent cation exchange resin beads, and in Module C, the ratio was 25 percent dopant material to 75 percent cation exchange resin beads. As a result of the 15 percent reduction in dopant material contained in the layers of cation exchange resin beads, a 4 to 5 fold increase in product resistivity and slightly lower electrical resistance was produced in Module C. The results of the experiments show that both uniform and non-uniform dopant materials may be used to balance the conductivity of alternating layers, and that a greater amount of dopant material may be required when uniform beads are used.

TABLE 5

| | Module B (Experiment I) | Module B (Experiment II) | Module C (Experiment II) |
|---|---|---|---|
| Percent Dopant material in Cation Exchange Resin layer | 40% | 40% | 25% |
| Bead Characteristics | Uniform | Non-uniform | Non-uniform |
| Product Resistivity (MΩ-cm) | 15.4 | 3.4 | 16.3 |
| Product pH | ~7.0 | >7.0 | ~7.0 |
| Electrical Resistance (Ω) | 28.3 | 16.5 | 14.8 |

Although particular embodiments of the invention have been described in detail for purposes of illustration, various changes and modifications may be made without departing from the scope and spirit of the invention. All combinations and permutations of the electroactive media and operational methods are available for practice in various liquid deionization applications as the need arises. For example, the electrodeionization apparatus and method of the present invention can be applied to processes that are presently not practically feasible due to lack of scaling and fouling resistance, temperature resistance, chemical resistance, or electrical efficiency. Typical applications would be the purification and softening of relatively untreated municipal water, relatively untreated well water and brackish water, and water containing foulants such as polyclectrolytes, tannins, lignins, fulvic acid, and other polar or weakly ionized or large ionized organic compounds, foulants such as iron, sulfide, phosphates, silicates, and other multivalent ions. Other applications would be in the treatment and processing of foods and beverages, sugars and various sugar fractionations and chemical modifications, starches, milk and milk by-products, by-products from cheese manufacture such as whey, purification and fractionation of proteins, products of various fermentation processes such as alcoholic beverages, pharmaceutical products and the like, processes in the chemical, pharmaceutical, food and beverage industries requiring ion substitutions in the presence of foulants and chemical oxidants, mixed solutes in low level radioactive waste streams, waste water streams containing heavy metals and organic compounds, and liquids in industries such as the food and beverage, chemical, pharmaceutical, power, and chemical industries where operation at elevated temperatures are required, or where sterilization or sanitization by heat or chemical oxidants is required. Accordingly, the invention is not to be limited except as by the appended claims.

What is claimed is:

1. An electrodeionization apparatus, comprising:
   an ion-depleting compartment comprising alternating layers of ion exchange resin material;
   wherein at least one of said alternating layers comprises a specialized electroactive media, and said specialized electroactive media comprises a Type I anion exchange resin material; and
   at least one of said alternating layers comprises a doped cation exchange resin material.

2. The electrodeionization apparatus of claim 1, wherein said specialized electroactive media further comprises a material selected from the group consisting of Type II anion exchange resin material, weak base anion exchange resin material, and mixtures thereof.

3. The electrodeionization apparatus of claim 2, wherein said specialized electroactive media comprises about 90 percent of said Type I anion exchange resin material.

4. The electrodeionization apparatus of claim 3, wherein said ion-depleting compartment comprises four alternating layers of said ion exchange resin material.

5. The electrodeionization apparatus of claim 4, wherein a first and third layer of said four alternating layers of ion exchange resin material comprise said specialized electroactive media.

6. The electrodeionization apparatus of claim 5, wherein a second and a fourth layer of said four alternating layers of ion exchange resin material comprise said doped cation exchange resin material.

7. The electrodeionization apparatus of claim 6, wherein said doped cation exchange resin material comprises about 40 percent of said specialized electroactive media.

8. The electrodeionization apparatus of claim 6, wherein said doped cation exchange resin material comprises about 25 percent of said specialized electroactive media.

9. The electrodeionization apparatus of claim 4, wherein a second and a fourth layer of said four alternating layers of ion exchange resin material comprise of said specialized electroactive media.

10. The electrodeionization apparatus of claim 9, wherein a first and a third layer of said four alternating layers of ion exchange resin material comprise said doped cation exchange resin material.

11. The electrodeionization apparatus of claim 10, wherein said doped cation exchange resin material comprises about 40 percent of said specialized electroactive media.

12. The electrodeionization apparatus of claim 10, wherein said doped cation exchange resin material comprises about 25 percent of said specialized electroactive media.

13. The electrodeionization apparatus of any of the preceding claims, wherein said ion-depleting compartment includes opposing membranes spaced apart by at least about 1/16 inch.

14. The electrodeionization apparatus of claim 13, wherein said ion-depleting compartment includes opposing membranes spaced apart by about 1/16 to about 1/4 inch.

15. The electrodeionization apparatus of claim 14, wherein said alternating layers each comprise ion exchange resin beads of substantially uniform size.

16. The electrodeionization apparatus of claim 15, wherein said substantially uniform size beads have a mean diameter of about 500 $\mu$m to about 800 $\mu$m.

17. The electrodeionization apparatus of claim 13, wherein said ion-depleting compartment includes opposing membranes, and said inter-membrane spacing is about 1/4 to about 1/2 inches.

18. The electrodeionization apparatus of claim 17, wherein said alternating layers each comprise ion exchange resin beads of substantially uniform size.

19. The electrodeionization apparatus of claim 18, wherein said substantially uniform size beads have a mean diameter of about 500 $\mu$m to about 800 $\mu$m.

20. The electrodeionization apparatus of claim 19, wherein said layers have a thickness of between about 2 inches to about 4 inches.

21. The electrodeionization apparatus of claim 1, wherein said alternating layers each comprise ion exchange resin beads of substantially uniform size.

22. The electrodeionization apparatus of claim 20, wherein said substantially uniform size beads have a mean diameter of about 500 $\mu$m to about 800 $\mu$m.

23. The electrodeionization apparatus of claim 1, further comprising an ion-concentrating compartment.

24. The electrodeionization apparatus of claim 23, wherein said ion-concentrating compartment comprises an ion exchange resin material.

25. The electrodeionization apparatus of claim 24, wherein said ion-exchange resin material comprises a cation exchange resin material.

26. The electrodeionization apparatus of claim 24, wherein said ion-exchange resin material comprises an inert screen.

27. The electrodeionization apparatus of claim 26, wherein at least one of said alternating layers is doped.

28. The electrodeionization apparatus of claim 24, wherein said ion-concentrating compartment comprises alternating layers of ion exchange resin material.

29. An electrodeionization apparatus, comprising:
    an ion-depleting compartment comprising alternating layers of ion exchange resin material;
    at least one of said alternating layers comprising a specialized electroactive media;
    at least one of said alternating layers comprising a doped cation exchange resin material, wherein said dopant material comprises said specialized electroactive media;
    wherein said specialized electroactive media comprises at least about 60 percent of a Type I anion exchange resin material.

30. The electrodeionization apparatus of claim 29, wherein said specialized electroactive media further comprises a material selected from the group consisting of Type II anion exchange resin material, weak base anion exchange resin material, and mixtures thereof.

31. The electrodeionization apparatus of claim 30, wherein a first layer in said ion-depleting compartment is said doped cation exchange resin material.

32. The electrodeionization apparatus of claim 31, wherein said doped cation exchange resin material comprises about 40 percent of said specialized electroactive media.

33. The electrodeionization apparatus of claim 31, wherein said doped cation exchange resin material comprises about 25 percent of said specialized electroactive media.

34. The electrodeionization apparatus of claim 30, wherein a second layer in said ion-depleting compartment is said doped cation exchange resin material.

35. The electrodeionization apparatus of claim 34, wherein said doped cation exchange resin material comprises about 40 percent of said specialized electroactive media.

36. The electrodeionization apparatus of claim 34, wherein said doped cation exchange resin material comprises about 25 percent of said specialized electroactive media.

37. The electrodeionization apparatus of any of claims 29–36, wherein said ion-depleting compartment is bounded by opposing membranes spaced apart by at least about 1/16 inch.

38. The electrodeionization apparatus of claim 37, wherein said ion-depleting compartment is bounded by opposing membranes spaced apart by about 1/16 inch to about 1/4 inch.

39. The electrodeionization apparatus of claim 38, wherein said alternating layers comprise ion exchange resin beads of substantially uniform size.

40. The electrodeionization apparatus of claim 39, wherein said substantially uniform size beads have a mean diameter of about 500 $\mu$m to about 800 $\mu$m.

41. The electrodeionization apparatus of claim 37, wherein said ion-depleting compartment is bounded by opposing membranes, and said inter-membrane spacing is about 1/4 inch to about 1/2 inch.

42. The electrodeionization apparatus of claim 41, wherein said alternating layers comprise ion exchange resin beads of substantially uniform size.

43. The electrodeionization apparatus of claim 42, wherein said substantially uniform size beads have a mean diameter of about 500 $\mu$m to about 800 $\mu$m.

44. The electrodeionization apparatus of claim 43, wherein said layers comprise a thickness of between about 2 inches to about 4 inches.

45. The electrodeionization apparatus of claim 37, wherein said alternating layers comprise ion exchange resin beads of substantially uniform size.

46. The electrodeionization apparatus of claim 45, wherein said substantially uniform size beads have a mean diameter of about 500 $\mu$m to about 800 $\mu$m.

47. An electrodeionization apparatus, comprising:
    an ion-depleting compartment comprising alternating layers of ion exchange resin material, wherein at least one layer comprises a dopant material.

48. The electrodeionization apparatus of claim 47, wherein said at least one layer comprises less than about 50 percent, by volume, of said dopant material.

49. The electrodeionization apparatus of claim 48, wherein said at least one layer comprises less than about 40 percent, by volume, of said dopant material.

50. The electrodeionization apparatus of claim 49, wherein said at least one layer comprises less than about 30 percent, by volume, of said dopant material.

51. The electrodeionization apparatus of claim 50, wherein said at least one layer comprises less than about 20 percent, by volume, of said dopant material.

52. The electrodeionization apparatus of claim 51, wherein said at least one layer comprises less than about 10 percent, by volume, of said dopant material.

53. The electrodeionization apparatus of any of claims 47–52, wherein said dopant material is selected from the group consisting of cation exchange resin material, Type I anion exchange resin material, Type II anion exchange resin material, weak base anion resin material, zeolite resin material, synthetic activated carbon, hypercrosslinked sorbent resins, synthetic carbonaceous adsorbents, polymeric adsorbent resin beads, catalytic carbon, inert materials, and mixtures thereof.

54. The electrodeionization apparatus of claim 53, wherein said dopant material is selected from the group consisting of Type II anion exchange resin material, weak base anion exchange resin material, and mixtures thereof.

55. The electrodeionization apparatus of claim 47, wherein at least two adjacent ion exchange resin layers comprise a dopant material.

56. The electrodeionization apparatus of claim 55, wherein said at least two adjacent layers each comprise less than about 50 percent, by volume, of a dopant material.

57. The electrodeionization apparatus of claim 56, wherein said at least two adjacent layers each comprise less than about 40 percent, by volume, of a dopant material.

58. The electrodeionization apparatus of claim 57, wherein said at least two adjacent layers each comprise less than about 30 percent, by volume, of a dopant material.

59. The electrodeionization apparatus of claim 58, wherein said at least two adjacent layers each comprise less than about 20 percent, by volume, of a dopant material.

60. The electrodeionization apparatus of claim 59, wherein said at least two adjacent layers each comprise less than about 10 percent, by volume, of a dopant material.

61. The electrodeionization apparatus of any of claims 55–60, wherein said dopant material is selected from the group consisting of cation exchange resin material, Type I anion exchange resin material, Type II anion exchange resin material, weak base anion resin material, zeolite resin material, synthetic activated carbon, hypercrosslinked sorbent resins, synthetic carbonaceous adsorbents, polymeric adsorbent resin beads, catalytic carbon, inert materials, and mixtures thereof.

62. The electrodeionization apparatus of claim 61, wherein at least one of said two layers is doped with a dopant material selected from the group consisting of Type II anion exchange resin material, weak base anion exchange resin material, and mixtures thereof.

63. The electrodeionization apparatus of claim 47, wherein said alternating layers include uniformly sized resin beads.

64. The electrodeionization apparatus of claim 47, wherein said ion-depleting compartment includes opposing ion-permeable membranes spaced apart by about 1/4 inch to about 1/2 inch.

65. A method for purifying a fluid in an electrodeionization apparatus, comprising:
    providing an electrodeionization apparatus having an ion-depleting compartment;
    providing a first ion exchange resin material having a first conductivity value and a second ion exchange resin material having a second conductivity value different than the first;

reducing the difference between said first and second conductivity values by adding a dopant material to one of said first or second ion exchange resin materials;

positioning said first and second ion exchange resin materials in alternating layers in said ion-depleting compartment;

passing a fluid stream through said ion-depleting compartment; and applying an electric field across said electrodeionization apparatus.

66. The method of claim 65, wherein a first layer in said ion-depleting compartment is an anion exchange resin material.

67. The method of claim 66, further comprising providing said ion-depleting compartment with opposing ion permeable membranes spaced apart by at least about 1/16 inch.

68. The method of claim 67, further comprising providing said ion-depleting compartment with opposing ion permeable membranes spaced apart by about 1/16 to about 1/4 inch.

69. The method of claim 68, further comprising providing said ion-depleting compartment with opposing ion permeable membranes spaced apart by about 1/4 to about 1/2 inch.

70. The method of claim 69, further comprising providing said alternating layers at a thickness of about 2 to about 4 inches.

71. The method of claim 65, further comprising providing uniformly sized first and second ion exchange resin materials.

72. The method of claim 71, further comprising providing said uniformly sized ion exchange materials with a mean diameter of about 500 $\mu$m to about 800 $\mu$m.

73. The method of claim 65, wherein a first layer in said ion-depleting compartment is a cation exchange resin material.

74. The method of claim 65, further comprising providing said ion-depleting compartment with opposing ion permeable membranes spaced apart by at least about 1/16 inch.

75. The method of claim 74, further comprising providing said ion-depleting compartment with opposing ion permeable membranes spaced apart by about 1/16 to about 1/4 inch.

76. The method of claim 74, further comprising providing said ion-depleting compartment with opposing ion permeable membranes spaced apart by about 1/4 to about 1/2 inch.

77. The method of claim 65, further comprising providing said alternating layers at a thickness of about 2 to about 4 inches.

78. The method of claim 65, further comprising providing uniformly sized first and second ion exchange resin materials.

79. The method of claim 78, further comprising providing said uniformly sized ion exchange materials with a mean diameter of about 500 $\mu$m to about 800 $\mu$m.

80. The method of claim 65, further comprising reversing the polarity of the applied electric field in order to remove fouling from said ion exchange material.

81. An electrodeionization apparatus, comprising:

an ion-depleting compartment comprising alternating layers of ion exchange resin material, each layer having substantially the same thickness, wherein at least one layer comprises a dopant material.

82. An electrodeionization apparatus, comprising:

an ion-depleting compartment comprising alternating layers of ion exchange resin material, wherein a first layer comprises a doped cation exchange resin material, said apparatus constructed and arranged to provide a flow of water to be introduced into said first layer.

83. An electrodeionization apparatus, comprising:

an ion-depleting compartment constructed and arranged to provide ionic substitution in said ion-depleting compartment, and substantially uniform current distribution throughout said apparatus, said compartment including alternating layers of ion exchange resin material, at least one layer including a dopant material.

* * * * *